US011958963B2

(12) United States Patent
Karimi Nejad et al.

(10) Patent No.: US 11,958,963 B2
(45) Date of Patent: Apr. 16, 2024

(54) COMPOSITIONS AND METHODS FOR MAKING EPDM RUBBER SHEETING

(71) Applicant: CARLISLE CONSTRUCTION MATERIALS, LLC, Carlisle, PA (US)

(72) Inventors: Majid Karimi Nejad, Carlisle, PA (US); Michael O'Toole, Carlisle, PA (US); William J. Schneider, Mechanicsburg, PA (US); Anil Shenoy, Mechanicsburg, PA (US)

(73) Assignee: CARLISLE CONSTRUCTION MATERIALS, LLC, Carlisle, PA (US)

( * ) Notice: Subject to any disclaimer, the term of this patent is extended or adjusted under 35 U.S.C. 154(b) by 225 days.

(21) Appl. No.: 17/361,940

(22) Filed: Jun. 29, 2021

(65) Prior Publication Data

US 2021/0403693 A1 Dec. 30, 2021

Related U.S. Application Data

(60) Provisional application No. 63/046,221, filed on Jun. 30, 2020.

(51) Int. Cl.
| | |
|---|---|
| *C08L 23/16* | (2006.01) |
| *C08K 3/06* | (2006.01) |
| *C08K 3/22* | (2006.01) |
| *C08K 3/36* | (2006.01) |
| *C08K 5/09* | (2006.01) |
| *C08L 91/06* | (2006.01) |
| *E04D 5/06* | (2006.01) |

(52) U.S. Cl.
CPC .............. *C08L 23/16* (2013.01); *C08K 3/06* (2013.01); *C08K 3/22* (2013.01); *C08K 3/36* (2013.01); *C08K 5/09* (2013.01); *C08L 91/06* (2013.01); *C08K 2003/2241* (2013.01); *C08K 2003/2296* (2013.01); *E04D 5/06* (2013.01)

(58) Field of Classification Search
CPC .................... C08L 23/16; E04D 5/06
See application file for complete search history.

(56) References Cited

U.S. PATENT DOCUMENTS

| 5,096,743 A * | 3/1992 | Schoenbeck ............. E04D 5/06 |
| | | 427/180 |
| 2012/0045953 A1 | 2/2012 | Wang et al. |
| 2017/0191271 A1 | 7/2017 | Wang et al. |
| 2019/0021441 A1 | 1/2019 | Gopalan et al. |
| 2019/0309205 A1 | 10/2019 | Guo et al. |

FOREIGN PATENT DOCUMENTS

| CN | 108976604 A | 12/2018 |
| CN | 113024939 A | 6/2021 |

OTHER PUBLICATIONS

H. Ismail et al., "Combatibilization of Bentonite Filled Ethylene-Propylene-Diene Monomer Composites: Effect of Maleic Anhydride Grafted EPDM", published May 16, 2012, Journal of Applied Polymer Science 2013, vol. 127, Issue 2, pp. 1164-1171.

A.A. El-Wakil, "Enhancement of Adhesion Between EPDM and Polyester Fabric by Using Natural Rubber Modified by Maleic Anhydride", International Journal of Polymer Science 2011, vol. 2011, Article ID 591948, pp. 1-5.

International Searching Authority, International Search Report and Written Opinion for corresponding International Application No. PCT/US2021/039549, dated Oct. 4, 2021, 12 pages.

Pasbakhsh, P. et al., "Influence of Maleic Anhydride Grafted Ethylene Propylene Diene Monomer (MAH-g-EPDM) on the Properties of EPDM Nanocomposites Reinforced by Halloysite Nanotubes", Polymer Testing, Elsevier, Amsterdam, NL, vol. 28, No. 5, Aug. 1, 2009, pp. 548-559.

European Patent Office, Extended European Search Report for corresponding European Patent Application No. 21831641.2, dated Jan. 25, 2024, 9 pages.

\* cited by examiner

*Primary Examiner* — Zachary M Davis

(74) *Attorney, Agent, or Firm* — David R. Heckadon; Gordon Rees Scully Mansukhani LLP

(57) ABSTRACT

The disclosure herein relates rubber sheeting materials. Specifically, the disclosure relates to ethylene propylene diene monomer (EPDM) membranes that include maleic anhydride grafted EPDM. The EPDM rubber membranes may be used for weatherproofing buildings, and in particular, as a membrane for building façade.

14 Claims, No Drawings

COMPOSITIONS AND METHODS FOR MAKING EPDM RUBBER SHEETING

CROSS-REFERENCE TO RELATED APPLICATION

The present application claims priority to U.S. Provisional Patent Application Ser. No. 63/046,221, of same title, filed Jun. 30, 2020; the entire disclosure of which is incorporated herein by reference in its entirety for all purposes.

TECHNICAL FIELD

The disclosure herein relates rubber sheeting materials. In some embodiments, the disclosure relates to inorganic-filled olefinic rubber sheeting materials, including ethylene propylene diene monomer (EPDM) membranes. In some embodiments, the EPDM rubber sheeting materials includes grafted EPDM. In some embodiments, the EPDM rubber is used for weatherproofing buildings, in particular as a membrane for façade application.

BACKGROUND

Ethylene propylene diene monomer (EPDM) rubber has many remarkable properties such as heat resistance, chemical resistance, low electrical conductivity, stability at temperatures ranging from −50° F. to +350° F., flexibility at low temperatures, and weather resistance, to name a few. EPDM is cost effective and can be fabricated in a variety of ways including custom molding and extruded parts. EPDM has numerous applications in the automotive industry (e.g., hoses, seals, O-rings, gaskets, accumulator bladders, wire and cable connectors and insulators, diaphragm, and weather stripping); construction (e.g., roofing and waterproofing); HVAC (e.g., compressor grommets, tubing, gaskets, and seals); and in many other industries.

Mineral filler like silica is one of the most important fillers that is used in the rubber industries. The presence of silanol groups (hydroxyl groups) on the silica surface makes the surface polar and hinders good dispersion and wetting of silica in EPDM compounds. In addition, the formation of chemical bonds between hydrophilic silica and hydrophobic rubber like EPDM is difficult. Thus, they are a main contributor to poor physical properties. Utilizing an organosilane coupling agent can mitigate the mentioned phenomena but could also cause premature curing during mixing and extrusion especially at high temperatures. In addition, they can also reduce compound shelf life. Further, silanes with a safe scorch behavior are very expensive. An amorphous EPDM grafted with MAH can improve the filler-EPDM bonding, dispersion, and physical properties with a safe processing at high mixing and extrusion temperatures.

SUMMARY OF THE INVENTION

In one aspect, the disclosure herein is directed to grafted EPDM rubber membranes. In one embodiment, the EPDM membrane composition includes ethylene propylene diene monomer (EPDM) polymer, grafted EPDM polymer, silica, titanium dioxide, talc, oil, carbowax, and antioxidant. The grafted EPDM can be maleic anhydride grafted EPDM. The foregoing composition can also include a curing agent such as sulfur or a sulfur-releasing compound. The foregoing composition can also include activators and/or accelerators such as zinc oxide, steric acid, or combinations thereof.

A non-limiting example of an EPDM formulation includes EPDM, maleic anhydride grafted EPDM, silica, titanium dioxide, talc, oil, carbowax, stearic acid, zinc oxide, and an antioxidant.

In another aspect, the disclosure herein is directed to methods of making an EPDM roofing membrane comprising the steps of: making a homogeneous mixture of the composition of any one of the previous embodiments, processing the mixture into a membrane using either calendaring or roller die extruder, and then curing the membrane using heat with or without pressure.

DETAILED DESCRIPTION OF PREFERRED EMBODIMENTS

Ethylene propylene diene monomer (EPDM) rubber is a synthetic rubber compound made from ethylene, propylene, and a diene co-monomers that can be crosslinked via sulfur vulcanization. The present disclosure is directed to EPDM sheeting that includes cured rubber (e.g., EPDM) and inorganic filler (e.g., silica). In some embodiments, a silane coupling agent can be used to obtain an enhanced coupling between the silica and the rubber. In these embodiments, some formulations might exhibit premature curing and/or a reduction in compound shelf life. In some embodiments, maleic anhydride grafted EPDM (MAH-g-EPDM) is employed to enhance the coupling between the filler and the EPDM polymer. In this embodiment, the introduction of MAH-g-EPDM provides enhanced physical properties while maintaining the uncured shelf life and safety scorch properties. The rubber sheeting is prepared from rubber compounds composed of olefinic rubber such as EPDM, an inorganic filler such as silica, oil, a curative, and a grafted EPDM such as MAH-g-EPDM. Other ingredients may be added to the formula as desired.

Definitions

In the description that follows, a number of terms are extensively utilized. The following non-limiting definitions provide a clear and consistent understanding of the specification and claims, including the exemplary scope to be given such terms.

When the terms "one," "a," or "an" are used in this disclosure, they mean "at least one" or "one or more," unless otherwise indicated.

The terms "invention" or "present invention" as used herein are intended to be non-limiting and are not intended to refer to any single embodiment but encompasses all possible embodiments as described in the specification and the claims together with their equivalents.

Composition

EPDM rubber compounds generally include an EPDM polymer, (providing waterproof and elastic properties) and may include one or more of the following: (1) oil extenders; (2) cross linkers/curing agents; (3) processing aids (improving the processing behavior of the compound); (4) accelerators (assisting the vulcanization process); (5) antioxidants (for weather resistance); (6) antiozonants (for ozone resistance); (7) softeners and plasticizers (improving pliability); (8) reinforcing fillers (increasing modulus of elasticity and toughness) and non-reinforcing fillers; (9) flame retardants; and (10) other agents.

The olefinic copolymer that consists of three distinct monomers includes ethylene and propylene and diene monomer. In some embodiments, the diene monomer may include, but is not limited to, dicyclopentadiene, alkyldicyclopentadiene, 1,4-pentadiene, 1,4-hexadiene, 1,5-hexadiene, 1,4-heptadiene, 2-methyl-1,5-hexadiene, cyclooctadiene, 1,4-octadiene, 1,7-octadiene, 5-ethylidene-2-norbornene, 5-n-propylidene-2-norbornene, 5-(2-methyl-2-butenyl)-2-norbornene, and mixtures thereof. Elastomeric olefinic copolymers may be referred to as elastomeric olefinic terpolymers, terpolymers, or simply EPDM. In some embodiments, the terpolymer may include, but is not limited to, at least 55 weight percent ethylene content. In other embodiments, the elastomeric terpolymer may include, but is not limited to, 1 to 12 weight percent of diene monomer. Often, the EPDM may be characterized by a Mooney Viscosity (ML (1+4) at 125° C.) of about 20 to about 80. Various types of EPDM are commercially available.

In some embodiments, the EPDM can be grafted. In some embodiments, the grafted EPDM is a maleic anhydride grafted EPDM (MAH-g-EPDM). In these embodiments, the grafted EPDM can be from 0 to about 40 parts per hundred resin/rubber (phr), or from about 5 to about 25 phr. MAH-g-EPDM is characterized by the amount of MAH grafted onto the EPDM and the resulting Mooney viscosity. In some embodiments, the Mooney viscosity of grafted EPDM is about 20 MU to about 65 MU, or about 20 to about 45 MU, and the weight percent of MAH grafted onto the EPDM can vary from about 0.1% up to about 3%, or from about 0.1% up to about 0.9%. MAH-g-EPDM is available from Dow under the tradename Fusabond.

In some embodiments, the oils may be halogenated.

Non-limiting examples of cross linkers/curing/co-curing agents include peroxides (e.g., alpha-cumyl hydroperoxide; methylethylketone peroxide; hydrogen peroxide; acetylacetone peroxide; t-butyl hydroperoxide; t-butyl peroxybenzoate; 2,5-bis(t-butyl peroxy)-2,5-dimethylhexene; lauryl peroxide; benzoyl peroxide; 2,4-dichlorobenzoyl peroxide; dibenzoyl peroxide; bis(p-monomethylene-benzoyl) peroxide; bis(p-nitrobenzoyl peroxide; phenylacetyl peroxide; and mixtures thereof. Non-limiting examples of inorganic peroxides which can be used as co-curing agents with p-quinone dioxime include lead peroxide; zinc peroxide; barium peroxide; copper peroxide; potassium peroxide; silver peroxide; sodium peroxide; calcium peroxide; metallic peroxyborates; peroxychromates; peroxydicarbonates; peroxydiphosphates; peroxydisulfates; peroxygermanates; peroxymolybdates; peroxynitrates; magnesium peroxide; sodium pyrophosphate peroxide; and mixtures thereof.

Non-limiting examples of processing aids include hydrocarbon resins; fatty acids soaps; fatty acid esters; paraffins; polyethylene waxes; EVA waxes; phenolic resins; petroleum derived oils; and polyethyleneacrylic acid. In one embodiment, the processing aid is paraffinic oil. In other embodiments, the processing aid is essentially free of aromaticity. In another embodiment, the processing aid is naphthenic oil. Generally, the processing oil should be non-staining and not "bloom" to the surface of the cured rubber membrane. When used, the amount of processing oil can range from about 20 to about 120 phr, or from about 50 to about 80 phr.

Non-limiting examples of accelerators include thioureas such as ethylene thiourea, N,N-dibutylthiourea, N,N-diethylthiourea and the like; thiuram monosulfides and disulfides such as tetramethylthiuram monosulfide (TMTMS), tetrabutylthiuram disulfide (TBTDS), tetramethylthiuram disulfide (TMTDS), tetraethylthiuram monosulfide (TETMS), dipentamethylenethiuram hexasulfide (DPTH) and the like; benzothiazole sulfenamides such as N-oxydiethylene-2-benzothiazole sulfenamide, N-cyclohexyl-2-benzothiazole sulfenamide, N,Ndiisopropyl-2-benzothiazolesulfenamide, N-tert-butyl-2-benzothiazole sulfonamide (TBBS) (available as Delac® NS from Chemtura, Middlebury, CT) and the like; other thiazole accelerators such as 2-mercaptobenzothiazole (MBT), benzothiazyl disulfide (MBTS), N,N-diphenylguanidine, N,N-di-(2-methylphenyl)-guanidine, 2-(morpholinodithio) benzothiazole disulfide, zinc 2-mercaptobenzothiazole and the like; dithiocarbamates such as tellurium diethyldithiocarbamate, copper dimethyl dithiocarbamate, bismuth dimethyldithiocarbamate, cadmium diethyldithiocarbamate, lead dimethyldithiocarbamate, sodium butyldithiocarbamate, zinc diethyldithiocarbamate, zinc dimethyldithiocarbamate, zinc dibutyldithiocarbamate (ZDBDC) and mixtures thereof. In some embodiments, sulfur donor-type accelerators (e.g., di-morpholino disulfide and alkyl phenol disulfide) may be used in place of elemental sulfur or in conjunction with elemental sulfur if desired.

Non-limiting examples of polysulfide activators for the quinone-type co-curing agents include calcium polysulfide, sodium polysulfide, as well as organic polysulfides having the general formula R—(S) X—R, wherein R is a hydrocarbon group and x is a number from 2-4. Examples of organic polysulfides are disclosed in U.S. Pat. No. 2,619,481, which is incorporated herein by reference.

Non-limiting examples of softeners and plasticizers include paraffinic oils; nafthenic oil; diisononyl phthalate (DINP); diisodecyl phthalate (DIDP); dioctyl phthalate (DOP); di-n-hexyl phthalate; isodecyl diphenyl phosphate (e.g. Santicizer® 148); and tris (2-ethylhexyl) phosphate.

Non limiting examples of fillers include carbon black; non-black mineral fillers; clay; talc; chemically modified talc; ground coal; silicas, silicates; reinforcing silica; mica; calcium carbonate; and other organic materials.

Talc can be represented by the formulae $Mg_3Si_4O_{10}(OH)_2$ or $3MgO \cdot 4SiO_2 \cdot H_2O$. Non-limiting examples of talc include hydrated magnesium silicate, talcum, soapstone, steatite, cerolite, magnesium talc, steatite-massive, and mixtures thereof. Talc filler may contain various other minerals such as dolomite, chlorite, quartz, and the like. Talc used as filler may also exhibit characteristics such as hydrophobicity, organophilicity, non-polarity, and chemically inertness. Commercially available talc includes Mistron® Vapor Talc, Vertal MB, and Silverline 002 which are available from Luzenac America (Centennial, Colo.). Mistron® Vapor Talc is a soft, ultra-fine, white platy powder having a specific gravity of 2.75, a median particle size of 1.7 microns, an average surface area of 18 m/g, and a bulk density (tapped) of 20 lbs./ft. In one embodiment, talc is characterized as a platy, chemically inert filler having a specific gravity of from about 2.6 to about 2.8, a pH of about 7, and a moisture content of less than about 0.5 weight percent. Optionally, surface treated version of talc can be used. In some embodiments, talc can be employed in amounts of about 10 to about 100 phr, preferably about 20 to about 80 phr.

In some embodiments, clays, represented by the formula $Al_2—O_3 \cdot SiO_2 \cdot XH_2O$ may be used. Non-limiting examples of clays include hydrated aluminum silicate, kaolinite, montmorillonite, atapulgiteillite, bentonite, halloysite, and mixtures thereof. In some embodiments, clay can be employed in amounts of about 10 to about 100 phr, or in amounts of about 20 to 80 phr.

In some embodiments, reinforcing silicas are also used as non-black fillers, silica (silicon dioxide) utilizes the element silicon and combines it in a very stable way with two oxygen atoms. Basically, there are two different forms of silica, crystalline and amorphous (noncrystalline). The basic crystalline from of silica is quartz, although there are two other crystalline forms of silica that are less common-tridymite and cristobalite. Alternatively, the silicon and oxygen atoms can be arranged in an irregular form as can be identified by X-ray diffraction. This form of silica is classified as amorphous (noncrystalline), because there is no detectable crystalline silica as determined by X-ray diffraction. In some embodiments, amorphous silicas are utilized. In other embodiments, a fine particle, hydrated amorphous silica, which is available from PPG Industries, under the tradename HiSil® 233, is used. Reinforcing silicas are generally characterized in terms of surface area (m/g by the BET procedure) or particle size as determined by either electron microscopy or the Coulter Counter Method. In some embodiments, silicas can be employed in amounts of about 10 to about 110 phr, or in amounts of about 10 to about 40 phr.

Non-limiting examples of flame retardant include aluminum hydroxide (also referred to as aluminum trihydroxide); magnesium hydroxide; expandable graphite; zinc borate; ammonium polyphosphate; melamine polyphosphate; and antimony oxide.

Non-limiting examples of anti-UV and ageing agents include calcium carbonate, homogenizing agents, flame retardants, titanium dioxide, zinc oxide, stearic acid, and mixtures thereof.

Non-limiting examples of other agents include maleic anhydride adduct of polybutadiene; antidegradants (e.g., waxes and paraffinic products; poly(1,2-dihydro-2,2,4-trimethylquinoline) (TMQ); methyl-2-mercaptobenzimidazole (2-Mmbi); N-Isopropyl-N'-phenyl-1,4-phenylenediamine (IPPD); N-(1,3-Dimethylbutyl)-N'-phenyl-p-phenylenediamine (6PPD); and butylated hydroxytoluene (BHT)).

In one embodiment, the EPDM rubber compound includes a flame retardant. The amount of flame retardant can be from about 10% to about 90%. Often the flame retardant is aluminum hydroxide or expandable graphite or both. The amount of aluminum hydroxide can be from about 10% to about 90%. The amount of expandable graphite can be from about 2% to about 25%.

In another embodiment, the EPDM rubber compound includes a cross-linker. The amount of cross linker can be from about 1% to about 10% or from about 0 to about 30 phr. Often the cross linker can be maleic anhydride adduct of polybutadiene; SCA 98; NXT silane, deolink MX; or combinations thereof. When used the amount of maleic anhydride adduct of polybutadiene can be from about 1% to about 20%, or from about 0.5 to about 30 phr.

In another embodiment the EPDM rubber compound includes a plasticizer. The amount of plasticizer can be from about 0% to about 60%. In some embodiments, the plasticizer is not mineral oil. Often the plasticizer is tris (2-ethylhexyl) phosphate. The amount of tris (2-ethylhexyl) phosphate can be from about 0% to about 25%.

In another embodiment, the EPDM rubber compound includes fillers. The amount of fillers can be from about 0% to about 50% or from about 0 to about 200 phr. Often, the filler can be silica, titanium dioxide, talc, or combinations thereof.

In another embodiment, the EPDM rubber compound includes a curing agent. The amount of curing agent can be from about 0% to about 5% or from about 0 to about 10 phr. Often, the curing agent is sulfur, SCA 98, NXT silane, deolink, and combinations thereof. The amount of sulfur can be from about 0% to about 3% or from about 0 to about 5 phr. Alternatively, suitable amounts of sulfur can be about 0.5 to about 3 parts by weight (pbw) sulfur per 100 parts by weight rubber.

In another embodiment, the EPDM rubber compound includes accelerators. The amount of accelerators can be from about 0% to about 8%, or from about 0 to about 15 phr. The accelerator may be tetrabenzylthiuram disulfide, sulfur, zinc oxide, steric acid, or combinations thereof. The amount of tetrabenzylthiuram disulfide can be from about 0% to about 8%. The amount of activators can be from about 0% to about 8%. The amount of zinc oxide can be from about 0% to about 10%. The amount of steric acid can be from about 0% to about 5%. The amount of accelerator may be determined by the application and curing method.

In another embodiment, the EPDM rubber compound includes processing aids. The amount of processing aid can be from about 20 to about 120 phr, or from about 50 to about 80 phr. The processing aid may be oil, polyethylene wax, carbowax, or combinations thereof.

In another embodiment, the EPDM rubber compound includes antioxidant. The amount of antioxidant can be from about 0 to about 10 phr.

In another embodiment, the EPDM rubber compound includes EPDM, silica, titanium dioxide, talc, clear process oil, carbowax, stearic acid, zinc oxide antioxidant, sulfur, and curing agents.

In another embodiment, the EPDM rubber compound includes EPDM, silica, titanium dioxide, talc, clear process oil, polyethylene wax, SCA 98 PL, carbowax, stearic acid, zinc oxide antioxidant, sulfur, and curing agents.

In another embodiment, the EPDM rubber compound includes EPDM, silica, titanium dioxide, talc, clear process oil, polyethylene wax, SCA 98 wt, carbowax, stearic acid, zinc oxide antioxidant, sulfur, and curing agents.

In another embodiment, the EPDM rubber compound includes EPDM, silica, titanium dioxide, talc, clear process oil, polyethylene wax, NXT silane, carbowax, stearic acid, zinc oxide antioxidant, sulfur, and curing agents.

In another embodiment, the EPDM rubber compound includes EPDM, silica, titanium dioxide, talc, clear process oil, polyethylene wax, deolink MX, carbowax, stearic acid, zinc oxide antioxidant, sulfur, and curing agents.

In another embodiment, the EPDM rubber compound includes EPDM, silica, titanium dioxide, talc, clear process oil, MAH-g-EPDM, carbowax, stearic acid, zinc oxide antioxidant, sulfur, and curing agents.

In another embodiment, the EPDM rubber compound includes EPDM, silica, titanium dioxide, talc, clear process oil, deolink MX, MAH-g-EPDM, carbowax, stearic acid, zinc oxide antioxidant, sulfur, and curing agents.

Methods

Making the EPDM rubber products of the present invention generally involves three steps: mixing, processing, and curing. During the mixing step, the ingredients are formed into a homogenous mixture using a high-shear mixing machine such as an internal mixer, extruder, a two-roll mill, or other mixers suitable for forming viscous, relatively uniform mixtures. Non-limiting examples of mixers include Banbury mixers, which are internal mixers or mills or extruders. In one embodiment, the ingredients can be added together at once. In another embodiment, some dry ingredients such as mineral fillers, zinc oxide, stearic acid, and anti-UV and anti-aging materials are added first, followed by the liquid process oil, and finally the polymer, i.e., EPDM (this type of mixing can be referred to as an upside-down mixing technique). The resultant mixture forms a master batch to which the cure package can then be added. Two-stage mixing can be employed. The sulfur cure package (sulfur/accelerator) can be added near the end of the mixing cycle and at lower temperatures to prevent premature cross-linking of the EPDM. Mixing times generally range from about 2 to about 6 minutes.

During the processing step, the compound is formed into its final shape using molding, calendering, or extruding (e.g., roller dies). In some embodiments, the resulting admixture can be sheeted to a various thickness by conventional sheeting methods, for example, milling, calendaring, or extrusion.

Curing can be done using various methods including using a curative or cure system (including those disclosed in US Publ. No. 2000/60280892, incorporated herein by reference), heating (with or without pressure), and radiation (with or without pressure). In some embodiments, the molded compound can be cured in an autoclave or other rubber curing equipment such as compressing molding. In some embodiments, curing is accomplished by hot air-UHF or LCM at a specific temperature, generally between 135° C. to 180° C. or between 135° C. to 165° C. The cure time may be between about 2 minutes to about 9 hours depending upon the cure temperature. Once cured, the compound can be cut or trimmed to the desired dimensions.

In some embodiments, curing utilizes a sulfur or sulfur-based method. In other embodiments, the curing utilizes sulfur cure systems, peroxide cure systems, and quinone-type cure systems. The sulfur cure systems may be employed in combination with vulcanizing accelerators. The sulfur cure systems may be employed in combination with vulcanizing accelerators.

In one embodiment, the EPDM rubber compounds described herein can be processed into roofing material, specifically EPDM membranes for façade application. The EPDM roofing membranes are generally about 0.5 millimeters (mm) thick to about 3 mm thick. The roofing membranes are generally made of one, two, or more layers of EPDM rubber that may be calendered or laminated together. In some embodiments, the roofing membranes include a fabric layer, in or laminated on one or both sides.

EXAMPLES

Example 1—EPDM Rubber Formula

In this example, various EPDM rubber membranes were made using formulae 1 to 9 shown in Table 1, below.

TABLE 1

| Ingredients | 1 | 2 | 3 | 4 | 5 | 6 | 7 | 8 | 9 |
|---|---|---|---|---|---|---|---|---|---|
| EPDM polymer | 100 | 100 | 100 | 100 | 100 | 100 | 100 | 100 | 100 |
| Silica | 30 | 30 | 30 | 30 | 30 | 30 | 30 | 30 | 30 |
| Titanium dioxide | 37 | 37 | 37 | 37 | 37 | 37 | 37 | 37 | 37 |
| Talc | 74 | 74 | 74 | 74 | 74 | 74 | 74 | 74 | 74 |
| Process Oil (clear) | 60 | 60 | 60 | 60 | 60 | 60 | 60 | 60 | 60 |
| polyethylene wax |  | 5 | 5 | 5 | 5 |  |  | 5 | 5 |
| SCA 98 PL |  | 5 |  |  |  |  |  |  |  |
| SCA 98 wt |  |  | 4 |  |  |  |  |  |  |
| NXT silane |  |  |  | 2 |  |  |  |  |  |
| Deolink MX |  |  |  |  | 5 |  |  | 5 | 5 |
| MAH-g-EPDM (0.9% MAH) |  |  |  |  |  | 12 |  | 12 |  |
| MAH-g-EPDM (0.3% MAH) |  |  |  |  |  |  | 12 |  | 12 |
| Carbowax 3350 | 0.5 | 0.5 | 0.5 | 0.5 | 0.5 | 0.5 | 0.5 | 0.5 | 0.5 |
| Stearic Acid | 1 | 1 | 1 | 1 | 1 | 1 | 1 | 1 | 1 |
| Zinc oxide | 5 | 5 | 5 | 5 | 5 | 5 | 5 | 5 | 5 |
| Antioxidant | 3 | 3 | 3 | 3 | 3 | 3 | 3 | 3 | 3 |
| Final Mix | 310.5 | 320.5 | 319.5 | 317.5 | 320.5 | 322.5 | 322.5 | 332.5 | 332.5 |
| Sulfur | 1 | 0.5 | 0.44 | 1 | 0.8 | 1 | 1 | 0.8 | 0.8 |
| Cure package | 1.5 | 1.5 | 1.5 | 1.5 | 1.5 | 1.5 | 1.5 | 1.5 | 1.5 |
| Total PHR * | 313 | 322.5 | 321.4 | 320 | 322.8 | 325 | 325 | 334.8 | 334.8 |

* PHR = Parts by Hundred Rubber

The ingredients in the amounts listed above were added to an internal mixer in two steps and mixed for 1 to 10 minutes and reached a final temperature of 90° C. to 180° C. The mixture was dropped onto a two-roll sheeting mill and formed into 8 to 15 millimeter thick slabs. The slabs were processed into 0.5 to 3.0 millimeter thick sheets. Optionally, two sheets can be laminated into one membrane 0.5 to 3.0 millimeters thick. A dusting agent (e.g., talc or mica) or a liner (e.g., polyester or polyamide) was applied, and the membranes were placed on rolls. The rolls were vulcanized using an electric heated curing press for 40 minutes at 160° C.

Example 2

In this Example, the uncured EPDM membranes of Example 1 were evaluated according to ASTM D4637. The results are shown in Table 2, below.

TABLE 2

| Test description | 1 | 2 | 3 | 4 | 5 | 6 | 7 | 8 | 9 |
|---|---|---|---|---|---|---|---|---|---|
| Mooney Viscosity, Mu | 43.3 | 35 | 37 | 36 | 35 | 54 | 55 | 43 | 45 |
| Scorch time T10, minute | 52 | 39 | 24 | 36 | 38 | 46 | 47 | 42 | 43 |

TABLE 2-continued

| Test description | 1 | 2 | 3 | 4 | 5 | 6 | 7 | 8 | 9 |
|---|---|---|---|---|---|---|---|---|---|
| S' max{[Nm] | 6.14 | 6.39 | 6.98 | 7.52 | 6.62 | 5.69 | 7.06 | 6.04 | 6.24 |
| Cure rate@tc 50 dNm/min | 1.49 | 1.61 | 1.78 | 1.82 | 1.62 | 1.02 | 1.59 | 1.37 | 1.45 |
| Payne effect index | 0.47 | 0.63 | 0.62 | 0.57 | 0.6 | 0.72 | 0.63 | 0.73 | 0.81 |
| Tan d (0.1 hz) | 1.14 | 1.09 | 1.07 | 1.14 | 1.13 | 0.85 | 0.9 | 0.97 | 0.9 |

Example 3

In this Example, the cured EPDM membranes of Example 1 were evaluated according to ASTM D412. The results are shown in Table 3, below.

TABLE 3

| Test description | 1 | 2 | 3 | 4 | 5 | 6 | 7 | 8 | 9 |
|---|---|---|---|---|---|---|---|---|---|
| Tensile strength, psi | 1595 | 1451 | 1666 | 1514 | 1542 | 1560 | 1596 | 1550 | 1542 |
| 300% Modulus, psi | 329 | 512 | 596 | 485 | 492 | 521 | 508 | 551 | 681 |
| Elongation at break, % | 960 | 944 | 835 | 866 | 923 | 953 | 941 | 932 | 815 |
| Hardness (Shore A) | 48 | 54 | 55 | 55 | 54 | 50 | 52 | 53 | 52 |
| Tear resistance (ibf/in) | 167 | 215 | 226 | 205 | 214 | 205 | 213 | 217 | 216 |

Example 4—EPDM Rubber Formula Comparison

In this example, EPDM rubber membranes were made using formulae 10 to 11 shown in Table 4, below.

TABLE 4

| Ingredients | 10 | 11 |
|---|---|---|
| EPDM polymer | 100 | 100 |
| Silica | 30 | 30 |
| Titanium dioxide | 37 | 37 |
| Talc | 74 | 74 |
| Process Oil (clear) | 60 | 60 |
| SCA 98 PL | | 3 |
| MAH-g-EPDM (0.3% MAH) | | 3 |
| Carbowax 3350 | 0.5 | 0.5 |
| Stearic Acid | 1 | 1 |
| Zinc oxide | 5 | 5 |
| Antioxidant | 3 | 3 |
| Final Mix | 310.5 | 316.5 |
| Sulfur | 1 | 0.9 |
| Cure package | 1.5 | 1.5 |
| Total PHR * | 313 | 318.9 |

* PHR = Parts by Hundred Rubber

The ingredients in the amounts listed above were made in accordance with the procedures outlined above for samples 1-9.

Example 5

In this Example, the uncured EPDM membranes of Example 4 were evaluated according to ASTM D4637. The results are shown in Table 5, below.

TABLE 5

| Test description | 10 | 11 |
|---|---|---|
| Mooney Viscosity, Mu | 49 | 46 |
| Scorch time T10, minute | 17 | 19 |
| S' max{[Nm] | 8.1 | 8.7 |
| Cure rate@tc 50 dNm/min | 2.17 | 2.62 |
| Payne effect index | 0.158 | 0.233 |
| Tan d (0.1 hz) | 1.05 | 1.01 |

Example 6

In this Example, the cured EPDM membranes of Example 4 were evaluated according to ASTM D412. The results are shown in Table 6, below.

TABLE 6

| Test description | 10 | 11 |
|---|---|---|
| Tensile strength, psi | 1680 | 1665 |
| 300% Modulus, psi | 288 | 478 |
| Elongation at break, % | 931 | 857 |
| Hardness (Shore A) | 51 | 56 |

The examples set forth above are provided to give those of ordinary skill in the art a complete disclosure and description of how to make and use embodiments of the compositions and are not intended to limit the scope of what the inventors regard as their invention. Modifications of the above-described modes (for carrying out the invention that are obvious to persons of skill in the art) are intended to be within the scope of the following claims. All publications, patents and patent applications cited in this specification are incorporated herein by reference as if each such publication, patent or patent application were specifically and individually indicated to be incorporated herein by reference.

What is claimed is:

1. A composition comprising ethylene propylene diene monomer (EPDM) polymer, maleic anhydride grafted EPDM polymer, silica, titanium dioxide, talc, oil, polyethylene glycol, a silane coupling agent, and an antioxidant, wherein the maleic anhydride grafted EPDM polymer comprises from about 0.5 to about 30 phr, and the silane coupling agent comprises up to about 10 phr.

2. The composition of claim 1 further comprising an accelerator.

3. The composition of claim 2, wherein the accelerator is zinc oxide, stearic acid, or a combination thereof.

4. The composition of claim 1, wherein the maleic anhydride grafted EPDM polymer comprises from about 1 to about 20 phr.

5. A membrane comprising EPDM, maleic anhydride grafted EPDM, silica, titanium dioxide, talc, oil, polyethylene glycol, a silane coupling agent, stearic acid, zinc oxide, and an antioxidant, wherein the maleic anhydride grafted EPDM polymer comprises from about 0.5 to about 30 phr, and the silane coupling agent comprises up to about 10 phr.

6. The membrane of claim 5 further comprising a fabric layer.

7. The membrane of claim 5, wherein the maleic anhydride grafted EPDM polymer comprises from about 1 to about 20 phr.

8. A method of making an EPDM membrane comprising the steps of:
   blending a homogeneous mixture of the composition of claim 1;
   forming the mixture into a membrane; and
   curing the membrane.

9. The method of claim 8, wherein the membrane is formed by molding.

10. The method of claim 8, wherein the membrane is formed by calendaring.

11. The method of claim 8, wherein the membrane is formed by extrusion.

12. Method of claim 8, wherein the curing step uses heat.

13. The method of claim 8 further comprising the step of laminating a fabric layer to the membrane.

14. The method of claim 8, wherein the homogenous mixture further comprises an accelerator.

\* \* \* \* \*